Nov. 28, 1944.  J. BOEKE  2,363,478
METHOD AND DEVICE FOR DETECTING TRACES OF FOREIGN
GASES, VAPORS, OR MISTS IN THE ATMOSPHERE
Filed Jan. 15, 1941  2 Sheets-Sheet 1

INVENTOR
JAN BOEKE
By
ATTORNEY.

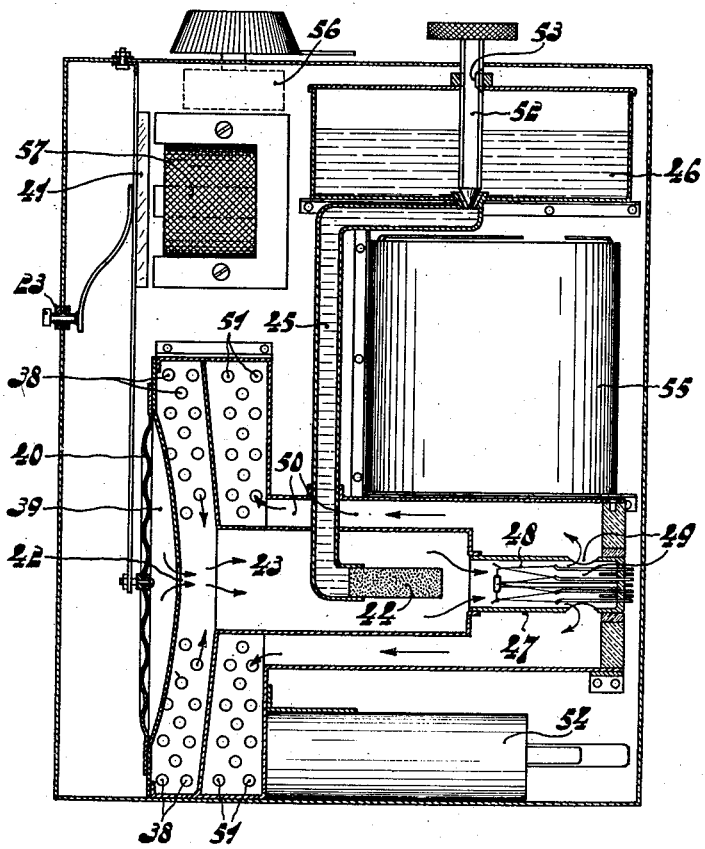

Patented Nov. 28, 1944

2,363,478

UNITED STATES PATENT OFFICE 2,363,478

METHOD AND DEVICE FOR DETECTING TRACES OF FOREIGN GASES, VAPORS, OR MISTS IN THE ATMOSPHERE

Jan Boeke, Eindhoven, Netherlands; vested in the Alien Property Custodian

Application January 15, 1941, Serial No. 374,583
In the Netherlands December 23, 1939

4 Claims. (Cl. 23—232)

The detection of the presence of determined gases in the atmosphere is generally known, for example, ammonia gas may be detected by litmus paper and hydrogen sulphide may be detected by means of lead acetate paper.

In order to effect this detection continuously and with automatic indication complicated apparatus is necessary such, for example, in that mode of indication in which said indicator paper is unreeled as a band from a supply roller, is exposed to the air and any change of colour is passed on as an electric signal by a photo-electric device. It may be observed in this respect that such devices generally do not react within a short time to traces of gas impurities.

Furthermore, it is known to indicate the presence of determined gases by means of the thermal effect produced in a reaction of the gas to be detected with another gas, e. g. air, under the influence of a catalytic substance such as platinum-asbestos; this method does not permit the detection of traces of foreign gas.

The invention relates to the detection of traces of foreign gases, vapors or mists in the atmosphere which, even in small quantities, are harmful to the living organism and have come in the atmosphere either intentionally or unintentionally, for example, as occurs in garages, mines and the like.

In this respect the invention is based on the finding that to be satisfactory for this purpose the sensitiveness and the speed of reaction of the detector have to comply with high requirements.

According to the invention, use is made for this purpose of a solid or colloidal substance with an active surface which is sensitive to the said traces and the activity of which is modified in a perceptible manner when the substance is exposed to air contaminated with the said traces.

By "active surfaces" are meant hereinafter surfaces which are able to energetically influence a state, for example a reaction or potential, this in contradistinction to the use of surfaces such as that of indicator paper, which facilitate the coming into contact with the gas phase of a reagent in the solid or liquid phase.

According to the invention the traces of foreign gas modify by either disturbing or stimulating a reaction which is taking place at the active surface in such manner that a measurable property of the system of which the active surface forms a part, such as a potential, is increased or decreased and this change is manifested in suitable signalling apparatus connected therewith.

The change in the activity of the active surface may be manifested, for example, in a change in adsorption or photo-emission or thermo-emission. In itself it is known, for example, that substances adsorbed in a monomolecular layer on active surfaces may phosphoresce and that this phosphorescence may be destroyed, for example, by traces of oxygen.

It is possible to carry the invention into effect with the use of a simple device in a particularly satisfactory manner if use is made of a surface with catalytic activity. As an example thereof we may mention the combination of oxygen and sulphur dioxide to form sulphur trioxide under the influence of iron oxide as a catalyst, which catalysis may be influenced in a positive sense by small quantities of arsenic trioxide.

Also ferments and enzymes of the living organism act catalytically and this catalysis may also be greatly influenced by traces of foreign substances, for example, they may be "poisoned" by traces of "poisons" such, for example, as carbon monoxide, hydrocyanic acid, hydrogen sulphide and some organic compounds of sulphur and arsenic.

It has been found that more particularly oxidation-reduction-catalysts, e. g. platinum and the platinum metals, which catalytically influence an oxidation- or reduction reaction are sensitive to poisoning by a large proportion of the poisons which are liable to poison the living organism.

According to one favourable mode of realisation of the invention these modifications of the catalyst may be easily rendered perceptible by electric means, viz. by the electric detection of the thermal effect of the said catalytic reaction. This may be effected in different ways which are known per se, for example by a measurement of the electrical resistance or otherwise.

The oxidation-reduction-reaction may preferably take place by the oxidation of the vapor of an organic substance, e. g. methyl alcohol, or of a mixture of organic substances, e. g. methyl alcohol and formaldehyde by air, or by the reduction of an organic substance, e. g. formaldehyde by hydrogen.

The invention will be explained more fully with reference to the particular mode of execution diagrammatically shown in the accompanying drawings in which Fig. 1 shows a somewhat diagrammatic showing of a simple arrangement of apparatus embodying my invention;

Figs. 2 and 2a show different forms embodying a different form of pump;

Figs. 3 and 4 shows further possible modifications and arrangements of apparatus for carrying out my invention.

Figure 1:
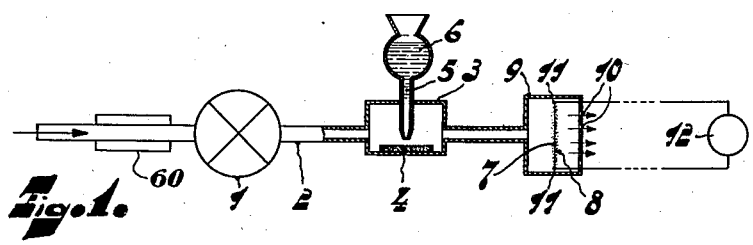

A pump 1 introduces air through a tube 2 into a vessel 3 in which is arranged a piece of felt 4 on which trickles methyl alcohol 5 with which a receptacle 6 is filled. The mixture of air and methyl alcohol thus produced flows to a wire 7 which is provided with a porous layer 8, for example of aluminum oxide or beryllium oxide, to which platinum-black is applied, with the result that there occurs a catalytic chemical reaction which heats the wire 7. The regular supply of the reaction-gas mixture, which supply is obtained inter alia, by the use of the said trickling device, assists in keeping constant the reaction temperature and consequently the temperature of the wire 7. Through perforations 10 the gas leaves the vessel 9 in which the wire 7 is arranged. The ends 11 of the wire are connected to a device 12 which indicates by electrical agency the variations in the temperature of the wire 7 which may be brought about due to the poisoning of the catalyst by the above-mentioned traces which pollute the atmosphere. In order to avoid disturbances due to variations in the temperature of the air sucked in by the device, this air may first be led through a member which regulates the temperature and wherein the air is preheated by a preheater 60, for example by a portion, which may be automatically regulated, of the exhaust air which leaves the reaction vessel through the perforations 10 and which is heated due to the catalytic oxidation.

The device 12 may preferably consist of a Wheatstone bridge in which the wire 7 constitutes one of the branches and which contains balancing resistors and a source of electricity in accordance with the known construction of such bridges. As the zero indicating instrument there may be utilised for portable apparatus a head telephone and for stationary apparatus, for example an amplifying device which acts on a loudspeaker, bell or siren.

When the bridge has been brought into equilibrium any variation in the temperature of wire 7 causes a variation in the resistance of this wire, due to which the equilibrium of the bridge is disturbed and the zero indicating instrument gives a signal independently of the direction of the temperature variation.

In this form of construction the decrease in the activity of the catalytic reaction is consequently converted with the aid of electric means into an easily perceptible signal. Although an embodiment of the invention of this kind is preferred on account of its particular suitability for a simple and practical construction, it is fundamentally also possible to bring about the perception with the aid of other means, for example by the use of a thermometer. In such a case the use of a bimetal thermometer is recommended.

In instances wherein the active surfaces are considerably poisoned due to the use thereof, the catalyst may be regenerated by heating it or by leading over it pure air of a suitable gaseous reaction-mixture, for example a mixture of ether and air. If desired, the heating may be made to take place automatically by electric means as soon as the poisoning attains a determined degree. In one favourable embodiment of the device an electric energy less than 300 watts is sufficient for this heating.

Figure 2:
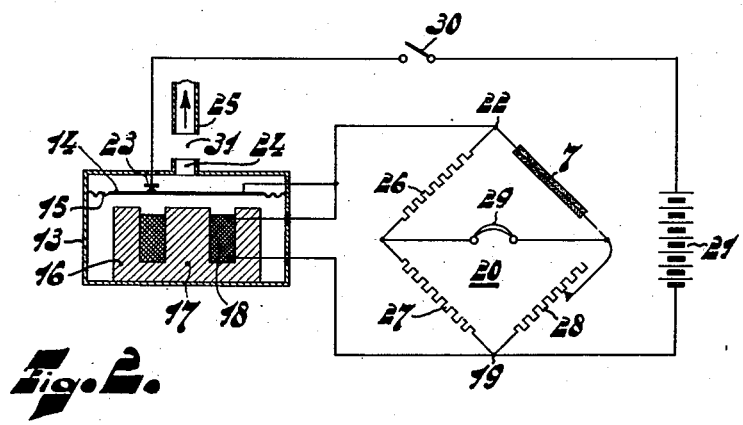

By an adequate choice of the pumping device 1 shown in Fig. 1 it is possible, by combining this device with the electric measuring device 7, 12 which is also shown in Fig. 1, to obtain a very simple transportable apparatus of small volume and weight. Such an apparatus is shown in Fig. 2 in which the pump is constituted by an electromagnetic device operating according to the Ruhmkorff-principle.

In a housing 13 is movably arranged, for example with the aid of resilient concentric rings 15, a membrane 14 of magnetisable material. Under the membrane is a soft-iron pot 16 comprising a core 17 on which a coil 18 is wound. One of the ends of the coil 18 is connected to a point 19 of a Wheatstone bridge 20 and to a source of direct current 21. The other end of the coil 18 is connected to a point 22 of the Wheatstone bridge and, moreover, to the movable membrane 14, which in its position of rest is connected by means of a contact 23 to the other side of the source of direct current 21. The housing 13 has an opening 24 in front of which is arranged a conduit 25 (only partly shown) which corresponds to the conduit 2 of Fig. 1.

In one of the branches of the Wheatstone bridge 20, which is equipped in the known manner with resistances 26, 27, and 28, is inserted the wire 7 represented in Fig. 1 whose variations in temperature are to be indicated. A head telephone 29 inserted in the bridge connection serves as an indicator responsive to unbalances of the bridge. In one of the supply conductors of the source of direct current there is furthermore provided a switch 30.

The whole device operates as follows: When switch 30 is closed, the electro-magnetic device operating according to the Ruhmkorff principle periodically attracts the membrane 14 whilst in the intervening time intervals the membrane returns again, owing to its own elasticity, into its position of rest. Owing to the vibration of the membrane which is thus produced air is sucked in through the opening 31 and is led through the conduit 25 to the place of destination.

The electro-magnetic device performs two functions since firstly the driving of the membrane is brought about thereby and secondly owing to the periodic closure and interruption of the contact between the membrane and the contact 23 there are produced voltage impulses which serve for the supply of the bridge-connection. The variations in the resistance of the wire 7 which are brought about due to temperature variations that may occur may be made audible, when the bridge is brought out of its equilibrium, in the telephone 29 as a buzzing tone.

In order to consume as little energy as possible it is possible to utilise, instead of the resistances 26 and 27 of the bridge-connection 20, the winding of the magnetic coil 18, which is provided for this purpose with a central tap which is connected in this case to the head telephone 29. Such an arrangement is shown in Fig. 2A in which the head telephone 29 is shown connected to a central tap 61 of the driving coil 18a of the pump. Besides, energy may further be saved by connecting in parallel with the magnetising coil a capacity 62 of such value that the electric resonance of this oscillating system corresponds to the frequency of the mechanical oscillation. This form of construction by which electric energy is economised renders it possible to construct an apparatus which consumes in operating condition 3 watts at the most and which consequently can easily be supplied by a few ordinary pocket lamp batteries, an easily portable form of construction of the apparatus being thus rendered possible.

Figure 3:
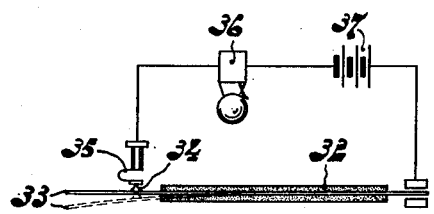

Fig. 3 represents a further form of construction in which the active surface 32 (denoted in Fig. 1 by 8) is present on a bimetallic strip 33 which is further provided with a contact point 34 which cooperates with a contact spring 35 which is electrically connected to the circuit which comprises an alarm signal 36 and a source of current 37.

Dotted lines indicate the position of the bimetallic strip 33 when the active surface functions normally. As soon as the activity of the active surface is reduced to a determined extent, due to poisoning thereof, with the result that the temperature of the bimetallic strip is decreased, the contact point 34 makes contact with the contact spring 35, owing to which the circuit fed by the source of current 37 is closed and the alarm signal 36 operates.

Fig. 4 shows a suitable arrangement of the constituent parts of a portable apparatus such as has been constructed in practice according to the principle of Fig. 2. In order to ensure the greatest possible saving in weight and volume the exciting winding 18 of Fig. 2, instead of the resistances 26 and 27, is incorporated in the bridge-connection for which purpose the winding is provided with a central tap 61 which is connected to the signalling device 29 (Fig. 2a). The feeding of the bridge is effected in this case by the voltage impulses produced in the two halves of the winding.

In Fig. 4 the air to be examined is sucked in through openings 38 of a pump 39 owing to the vibration of a membrane 40 which is driven by a vibrating armature 41 of an electro-magnetic system 57. With every stroke of the membrane a portion of the air sucked in is driven through an opening 42 into a tube 43 wherein the air passes along a rod 44 consisting of porous ceramic material. With the aid of a supply conduit 45 methyl alcohol is supplied from a receptacle 46 to the said rod so that the air passing along the latter is mixed with methyl alcohol vapors. The mixture is passed through a tube 47 wherein it comes into contact with a catalyst wire 48 suspended in zig-zag fashion and corresponding to the wire 7, 8 of Fig. 1. Owing to the catalytic oxidation of the vapor at this point the temperature of the mixture of air and vapor rises. The heated mixture leaves the tube 47 through openings 49 and flows through a tube 50 and finally leaves the apparatus through openings 51. Since the tube 43 is enclosed within the tube 50, preheating of the intake air is effected.

The supply of methyl alcohol may be cut off with the aid of a needle valve 52 by which at the same time the receptacle 46, which communicates in the condition of operation with the outside air through an opening 53 is shut off from the air.

The source of direct current denoted in Fig. 2 by 21 is represented in Fig. 4 by a pocket lamp battery 54.

As shown in Fig. 2a an electrolytic condenser 62 may furthermore be provided between the points 19 and 22, owing to which the electric resonance frequency of the electro-magnetic oscillator system, which consists of the inductance of the central tapped coil 18a (which is inserted in the bridge-connection in substitution for the resistances 26 and 27, as has been mentioned in the above) and the said electrolytic condenser is made equal to the mechanical frequency of the oscillating system: armature-pump membrane.

For the purpose of regenerating the catalyst 48 there are provided in the apparatus according to Fig. 4 three additional pocket lamp batteries 55 which may be connected to the catalyst by means of a switch which is likewise not shown. Since the catalyst wire should have a high resistance when operating and a relatively low resistance to facilitate regeneration thereof, the catalyst wire should preferably be subdivided into pieces which, in the operating condition of the bridge are connected in series in the branch concerned and for the purpose of heating are switched off from the bridge and are switched in parallel with the batteries 55. To that end the above-mentioned switch destined for the connection of the batteries 55 should preferably be formed as a series-parallel switch.

Finally Fig. 4 shows, in addition a variable resistance 56 which corresponds to the resistance 28 of Fig. 2.

For the sake of clearness the electric connections, in so far as they are present between the elements occurring in Fig. 4, are not shown.

What I claim is:

1. A method of detecting physiologically-toxic gases, vapors, mists and the like contaminating an atmosphere, by means of a catalyst capable of being deactivated by said contaminations, comprising mixing with said atmosphere a gaseous fluid capable of thermally reacting with the atmosphere in the presence of the catalyst, passing the so-formed mixture over the surface of the catalyst, and detecting any change in activity of the catalyst as an indication of the presence of said contamination in the atmosphere.

2. A method of detecting physiologically-toxic gases, vapors, mists and the like contaminating an atmosphere, by means of a catalyst capable of being deactivated by said contaminations, comprising mixing with said atmosphere a gaseous fluid capable of oxidizing in the atmosphere in the presence of the catalyst, passing the so-formed mixture over the surface of the catalyst, and detecting any change in activity of the catalyst as an indication of said contaminations in the atmosphere by measuring the temperature of the catalyst.

3. A device for detecting physiologically-toxic materials contaminating an atmosphere, comprising a conduit, a pulsating electromagnetic pump having a driving winding and being connected to said conduit for forcing the atmosphere through the conduit, means connecting with the conduit to add to the atmosphere therein a gaseous fluid capable of thermally reacting with the said atmosphere in the presence of a catalyst, a catalyst capable of being deactivated by any such contaminations positioned in the conduit beyond the fluid adding means, and a Wheatstone bridge for detecting deactivation of the catalyst as an indication of the presence of toxic materials in the atmosphere, said bridge being connected across the driving winding of said pump and being energized by pulsating current derived from said winding.

4. A device for detecting physiologically-toxic materials contaminating an atmosphere, comprising a conduit, a pulsating electromagnetic pump having a driving winding and being connected to said conduit for forcing the atmosphere through the conduit, means connecting with the conduit to add to the atmosphere therein a gaseous fluid capable of thermally reacting with the said atmosphere in the presence of a catalyst, a catalyst capable of being deactivated by any such contaminations positioned in the conduit beyond the fluid adding means, and a Wheatstone bridge energized by pulsating currents derived from said winding for detecting deactivation of the catalyst as an indication of the presence of toxic materials in the atmosphere, the said catalyst constituting one leg member of the Wheatstone bridge and the said driving winding constituting two legs of the said bridge.

JAN BOEKE.